(12) United States Patent
Giuliano

(10) Patent No.: US 11,316,425 B2
(45) Date of Patent: Apr. 26, 2022

(54) PUMP CAPACITOR CONFIGURATION FOR SWITCHED CAPACITOR CIRCUITS

(71) Applicant: pSemi Corporation, San Diego, CA (US)

(72) Inventor: David Giuliano, Bedford, NH (US)

(73) Assignee: pSemi Corporation, San Diego, CA (US)

(*) Notice: Subject to any disclaimer, the term of this patent is extended or adjusted under 35 U.S.C. 154(b) by 0 days.

(21) Appl. No.: 16/863,993

(22) Filed: Apr. 30, 2020

(65) Prior Publication Data

US 2021/0021190 A1 Jan. 21, 2021

Related U.S. Application Data

(63) Continuation of application No. 16/221,925, filed on Dec. 17, 2018, now Pat. No. 10,680,513, which is a continuation of application No. 14/646,809, filed as application No. PCT/US2013/071569 on Nov. 25, 2013, which is a continuation of application No. 13/685,186, filed on Nov. 26, 2012, now Pat. No. 8,693,224.

(51) Int. Cl.
*H02M 3/07* (2006.01)

(52) U.S. Cl.
CPC ............ *H02M 3/07* (2013.01); *H02M 3/075* (2021.05); *H02M 3/072* (2021.05)

(58) Field of Classification Search
CPC ..... H02M 2003/072; H02M 2003/075; H02M 3/072; H02M 3/075
USPC ................................ 363/59–60, 61; 327/536
See application file for complete search history.

(56) References Cited

U.S. PATENT DOCUMENTS

2005/0007184 A1* 1/2005 Kamijo .................. H02M 3/07
327/536
2005/0007185 A1* 1/2005 Kamijo .................. H02M 3/07
327/536

* cited by examiner

*Primary Examiner* — Harry R Behm
(74) *Attorney, Agent, or Firm* — Finnegan, Henderson, Farabow, Garrett & Dunner, LLP

(57) ABSTRACT

A cascade multiplier includes a switch network having switching elements, a phase pump, and a network of pump capacitors coupled with the phase pump and to the switch network. The network of pump capacitors includes first and second capacitors, both of which have one terminal DC coupled with the phase pump, and a third capacitor coupled with the phase pump through the first capacitor.

27 Claims, 13 Drawing Sheets

PUMP CAPACITOR CONFIGURATION FOR SWITCHED CAPACITOR CIRCUITS

FIELD OF DISCLOSURE

The present inventive subject matter relates to switched capacitor converters for converting between different voltages.

BACKGROUND

Power converters may generally include switches and one or more capacitors. Such converters are used, for example, to power portable electronic devices and consumer electronics.

A switch-mode power converter is a specific type of power converter that regulates an output voltage or current by switching energy storage elements (i.e. inductors and capacitors) into different electrical configurations using a switch network.

A switched capacitor converter is a type of switch-mode power converter that primarily utilizes capacitors to transfer energy. In such converters, the number of capacitors and switches increases as the transformation ratio increases.

Switches in the switch network are usually active devices that are implemented with transistors. The switch network may be integrated on a single semiconductor substrate or on multiple monolithic semiconductor substrates. Alternatively, the switch network may be formed using discrete devices. Furthermore, because a switch normally carries a large current, it may be composed of numerous smaller switches in parallel.

A common type of switched capacitor converter is a cascade multiplier switched capacitor converter. Two examples of cascade multipliers 16A are shown in FIGS. 1A-1B. The cascade multiplier 16A illustrated in FIG. 1A is often referred to as a Crockcoft-Walton voltage multiplier while the cascade multiplier 16A illustrated in FIG. 1B is often referred to as a Dickson charge pump.

The cascade multiplier 16A illustrated in FIG. 1A receives an input voltage VIN from a voltage source 14 and produces an output voltage VO that is four times the input voltage VIN. Assuming the input voltage VIN is equal to one volt, the operation of the cascade multiplier 16A illustrated in FIG. 1A is described as follows.

A clock with first and second clock intervals generates a voltage at a pump node P1 repeated at a pre-defined frequency. This clock is responsible for controlling the transfer of charge from the voltage source 14 to a load 18. In this example, it takes three iterations of the first and second clock intervals for the initial charge from the voltage source 14 to reach the load 18.

During the first clock interval, the voltage at the pump node P1 is zero volts, and odd labeled diodes D1, D3, D5 conduct current. As a result, charge is transferred from the voltage source 14 to a first pump capacitor CA11, from a first DC capacitor CAZ1 to a second pump capacitor CA12, from a second DC capacitor CAZ2 to a third pump capacitor CA13, and from a third DC capacitor CAZ3 to the load 18.

During the second clock interval following the first clock interval, the voltage at the pump node P1 is one volt, and even labeled diodes D2, D4, D6 conduct current. Consequently, charge is transferred from the first pump capacitor CA11 to the first DC capacitor CAZ1, from the second pump capacitor CA12 to the second DC capacitor CAZ2, and from the third pump capacitor CA13 to the third DC capacitor CAZ3 and the load 18.

The voltage at a first switch node NA11 alternates between one volt and two volts, the voltage at a second switch node NA12 alternates between two volts and three volts, and the voltage at a third switch node NA13 alternates between three volts and four volts. As a result, there is a difference of one volt across each of the pump capacitors CA11-CA13. Meanwhile, the voltage at a first DC node NAZ1 is two volts and the voltage at a second DC node NAZ2 is three volts, resulting in a difference of one volt across each of the DC capacitors CAZ1-CAZ3.

In general, the maximum voltage across each of the pump capacitors CA11-CA13 and DC capacitors CAZ1-CAZ3 in the cascade multiplier 16A is equal to the input voltage VIN, assuming that the peak voltage at the pump node P1 is the input voltage VIN.

Similarly, the cascade multiplier 16A illustrated in FIG. 1B receives an input voltage VIN from a voltage source 14 and produces an output voltage VO that is seven times the input voltage VIN. Assuming the input voltage VIN is equal to one volt, the operation of the cascade multiplier 16A illustrated in FIG. 1B is described as follows.

A first clock generates a voltage at a first pump node P1 and a second clock generates a voltage at a second pump node P2. The first clock and the second clock are one hundred and eighty degrees out of phase with each other, such that they have first and second clock intervals repeated at a pre-defined frequency. These clocks are responsible for controlling the transfer of charge from the voltage source 14 to a load 18. In this example, it takes four iterations of the first and second clock intervals for the initial charge from the voltage source 14 to reach the load 18.

During the first clock interval, the voltage at the first pump node P1 is zero volts, the voltage at the second pump node P2 is one volt, and odd labeled diodes D1, D3, D5, D7 conduct current. As a result, charge is transferred from the voltage source 14 to a first pump capacitor CA11, from a second pump capacitor CA21 to a third pump capacitor CA12, from a fourth pump capacitor CA22 to a fifth pump capacitor CA13, and from a sixth pump capacitor CA23 to the load 18.

During the second clock interval following the first clock interval, the voltage at the first pump node P1 is one volt, the voltage at the second pump node P2 is zero volts, and even labeled diodes D2, D4, D6 conduct current. Consequently, charge is transferred from the first pump capacitor CA11 to the second pump capacitor CA21, from the third pump capacitor CA12 to the fourth pump capacitor CA22, and from the fifth pump capacitor CA13 to the sixth pump capacitor CA23.

The voltage at a first switch node NA11 alternates between one volt and two volts, the voltage at a second switch node NA12 alternates between three volts and four volts, and the voltage at a third switch node NA13 alternates between five volts and six volts. This results in a difference of one volt, two volts, three volts, four volts, five volts, and six volts across pump capacitors CA11, CA21, CA12, CA22, CA13, CA23, respectively. Consequently, there is a different voltage across each pump capacitor.

Assuming, the peak voltage at the first and second pump nodes P1, P2 is the input voltage VIN. The minimum voltage stress is across the first pump capacitor CA11 and equal to the input voltage VIN. While the maximum voltage stress is across the sixth pump capacitor CA23 and equal to six times the input voltage VIN.

It is often desirable for all the capacitors in a cascade multiplier 16A to have the same voltage stress because the same type of capacitor can be used for each capacitor. It is typically more costly to select a separate type of capacitor for each capacitor due to increased supply chain complexity. Furthermore, if the cascade multiplier 16A is monolithically integrated, then it is often more cost effective to include only one type of capacitor with a given voltage rating.

On the other hand, a low voltage capacitor stores less energy than a high voltage capacitor. For example, a cascade multiplier 16A with a series stacked pump capacitor configuration as in FIG. 1A would require a larger amount of total capacitance to achieve the same efficiency as a cascade multiplier 16A with a parallel stacked pump capacitor configuration as in FIG. 1B.

Therefore, it is desirable to have the flexibility to control the distribution of voltage stress among the capacitors along with the maximum and minimum voltage stress across the capacitors.

SUMMARY

In one aspect, the invention features an apparatus including a first terminal, a second terminal, and a first cascade multiplier coupled between the first and second terminals for causing an electric potential at the first terminal to be a multiple of an electric potential at the second terminal. The first cascade multiplier includes a first set of switching elements, one of which is coupled with the first terminal and another of which is coupled with the second terminal. This first set of switching elements includes first and second switching elements. The first switching element, which has a first and second terminal, has a first state in which current flows through it, and a second state in which current flow through it is suppressed. The second switching element also has first and second states. In the first state, current flows through the second switching element, and in the second state, current flow through the second switching element is suppressed. Like the first switching element, the second has first and second terminals. The first terminal of the second switching element is coupled with the second terminal of the first switching element. The first cascade multiplier also has a first circuit with a first and second state of operation for providing a first electric potential, and a second circuit for providing a second electric potential, and a first capacitor network. This first capacitor network is coupled between the first circuit and the first set of switching elements. It includes a set of capacitors, each of which has a first terminal and a second terminal, the first terminals being coupled with corresponding ones of selected nodes between pairs of the switching element. Among the capacitors in this set of capacitors are first and second capacitors, the second terminals of which are DC coupled with the first circuit, a third capacitor coupled with the first circuit through the first capacitor, and a second capacitor network coupled between the second circuit and the first set of switching element.

In another aspect, the invention features an apparatus including a first terminal, a second terminal, and a first cascade multiplier coupled between the first and second terminals for causing an electric potential at the first terminal to be a multiple of an electric potential at the second terminal. The first cascade multiplier includes a first set of switching elements, one of which is coupled with the first terminal and another of which is coupled with the second terminal. This first set of switching elements includes first and second switching elements. The first switching element, which has a first and second terminal, has a first state in which current flows through it, and a second state in which current flow through it is suppressed. The second switching element also has first and second states. In the first state, current flows through the second switching element, and in the second state, current flow through the second switching element is suppressed. Like the first switching element, the second has first and second terminals. The first terminal of the second switching element is coupled with the second terminal of the first switching element. The first cascade multiplier also has a first circuit with a first and second state of operation for providing a first electric potential, and a second circuit for providing a second electric potential, and a first capacitor network. This first capacitor network is coupled between the first circuit and the first set of switching elements. The first cascade multiplier also includes a second capacitor network coupled between the second circuit and the first set of switching element. At least one of the first and second capacitor networks includes a set of capacitors, each of which has a first terminal and a second terminal, the first terminals being coupled with corresponding ones of selected nodes between pairs of the switching element. Among the capacitors in this set of capacitors are first and second capacitors, the second terminals of which are DC coupled with the first circuit, a third capacitor coupled with the first circuit through the first capacitor.

In some embodiments, the at least one of the first and second capacitor networks is the first capacitor network. However, in others, the at least one of the first and second capacitor networks is the second capacitor network.

Some embodiments also include a controller. The controller is configured for causing selected switching elements from the plurality of switching elements to transition between the first and second states so as to cause a voltage at the first terminal to be a multiple of a voltage at the second terminal. Such configuration causes a physical transformation in the controller by providing new functions that the controller had hitherto been unable to perform. In the case of programmable controllers, this configuration can include reprogramming the controller, thus causing the controller to effectively become a completely new machine.

A variety of switching elements can be used in different embodiments. For example, in some embodiments, the first switching element includes a diode that is forward biased to be placed in the first state, and reverse biased to be placed in the second state. In other embodiments, however, the first switching element includes a switch. And in yet others, this first switching element includes a transistor. Embodiments of the invention can also include switching elements selected from any combination of the foregoing.

In some embodiments, the second circuit is configured to provide a second time-varying electric potential switching between a first state and a second state at a specific, or pre-defined frequency. Embodiments include various phase differences between the second time-varying electric potential and the first. However, particular embodiments of the invention include those in which the second time-varying electric potential is one hundred and eighty degrees out of phase with the first time-varying electric potential. Among these are those embodiments in which the second capacitor network includes a set of capacitors, each capacitor having a first terminal and a second terminal, the first terminals being coupled with corresponding ones of selected nodes between pairs of the switching elements, wherein the set of capacitors includes first and second capacitors, the second terminals of which are DC coupled with the second circuit, and a third capacitor coupled with the second circuit through the first capacitor.

In other embodiments, however, the second circuit has one and only one state.

In yet other embodiments, the cascade multiplier further includes a second set of switching elements one of which is coupled with the first terminal and another of which is coupled with the second terminal. The second set of switching elements includes first and second switching elements, both of which have first and second terminals. Each switching element has first and second states. In the first state, current flows through the switching element. In the second state, current flow through the switching element is suppressed. The first terminal of the second switching element is coupled with the second terminal of the first switching element. The cascade multiplier of this embodiment also includes a third circuit for providing a third electric potential. This third electric potential is a time-varying electric potential that transitions between a first value and a second value at the specific frequency, and a third capacitor network coupled between the third circuit and the second set of switching elements.

In some of the foregoing embodiments, the third capacitor network includes a set of capacitors, each of which has a first terminal and a second terminal, the first terminals being coupled with corresponding ones of selected nodes between pairs of the switching elements from the second set of switching elements. The set of capacitors from the third capacitor network includes first and second capacitors, the second terminals of which are DC coupled with the third circuit, and a third capacitor coupled with the third circuit through the first capacitor.

Among the embodiments are those that also have a controller configured for causing selected switching elements from the set of switching elements to transition between the first and second states to cause a voltage at the first terminal to be a multiple of a voltage at the second terminal. In some embodiments, that multiple is an integer. However, in others, it is not.

In some embodiments, the second circuit is configured to provide a constant electric potential.

In others, the second circuit is configured to provide a second time-varying electric potential, the second time-varying electric potential switching between a first value and a second value at a specific frequency. Among these are embodiments in which the second capacitor network includes a set of capacitors, each capacitor having a first terminal and a second terminal, the first terminals being coupled with corresponding ones of selected nodes between pairs of the switching elements, wherein the set of capacitors includes first and second capacitors, the second terminals of which are DC coupled with the second circuit, and a third capacitor coupled with the second circuit through the first capacitor.

In another aspect, the invention features an apparatus including a cascade multiplier. Such a cascade multiplier includes a switch network having switching elements, a phase pump, and a network of pump capacitors coupled with the phase pump and to the switch network. The network of pump capacitors includes first and second capacitors, the second terminals of which are DC coupled with the phase pump, and a third capacitor coupled with the phase pump through the first capacitor.

Some embodiments also include a controller configured for causing selected switching elements to transition between first and second states to cause a voltage at the first terminal to be a multiple of a voltage at the second terminal.

In yet other embodiments, the apparatus has at least one of a transceiver, a processor, and a memory that receives power DC or AC from the cascade multiplier. Such an apparatus could be a cell phone, a smart phone, a computer, including a tablet computer, and a game console.

In another aspect, the invention features an apparatus having a cascade multiplier, the cascade multiplier having a switch network having switching elements, a phase pump, and first and second capacitor networks coupled to the switch network, wherein at least one of the first and second networks comprises a network of pump capacitors coupled with the phase pump and to the switch network, and wherein at least one of the first and second capacitor networks comprises first and second capacitors, the second terminals of which are DC coupled with the phase pump, and a third capacitor coupled with the phase pump through the first capacitor.

In some embodiments, the first capacitor network is a pump capacitor network. In other embodiments, the first capacitor network is a DC capacitor network.

DESCRIPTION OF THE FIGURES

The foregoing features of the circuits and techniques described herein, may be more fully understood from the following description of the figures in which.

DETAILED DESCRIPTION

This disclosure describes a method of controlling the voltage stress of the capacitors within a cascade multiplier type switched capacitor converter.

Figure 1A:
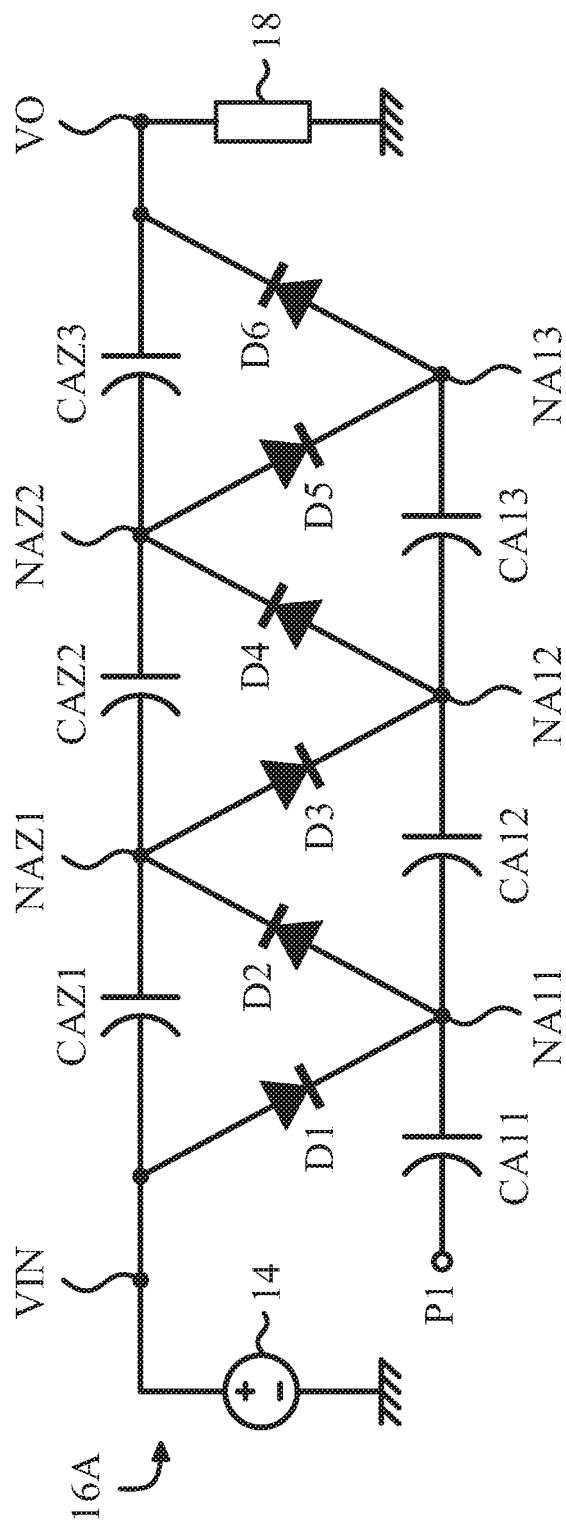
FIGS. 1A-1B shows two known cascade multipliers.
Figure 1B:
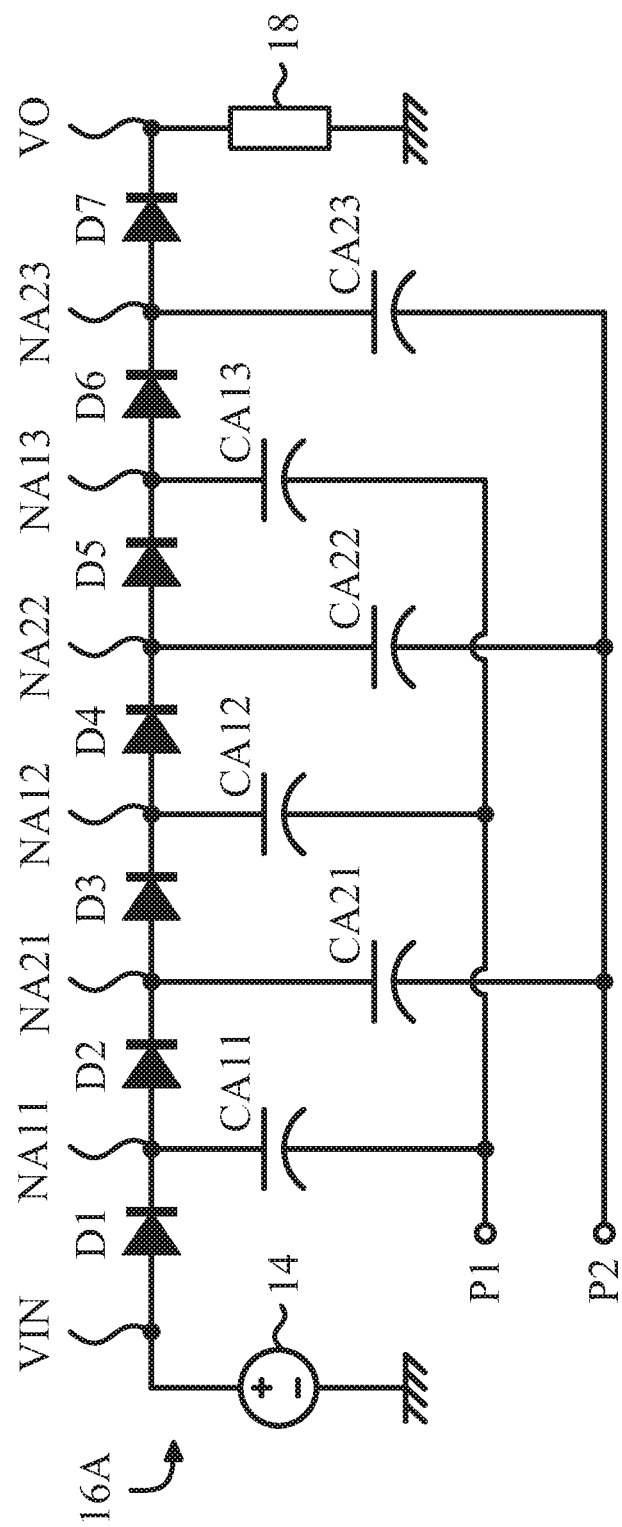

The distribution of voltage stress among the capacitors along with the maximum and minimum voltages stress across the capacitors is a function of the type of cascade multiplier and capacitor network configuration. For example, stacking the pump capacitors CA11-CA13 in series as shown in FIG. 1A causes a voltage stress that is uniform and equal among the pump capacitors CA11-CA13. In contrast, stacking the pump capacitors CA11-CA13 in parallel as shown in FIG. 1B causes the voltage stress to be non-uniform and unequal among the pump capacitors CA11-CA13.

Before describing several exemplary embodiments of cascade multipliers, it should be appreciated that in an effort to promote clarity in explaining the concepts, references are sometimes made herein to specific cascade multipliers. It should be understood that such references are merely exemplary and should not be construed as limiting. After reading the description provided herein, one of ordinary skill in the art will understand how to apply the concepts described herein to provide specific cascade multipliers.

It should be appreciated that reference is also sometimes made herein to particular input voltages and output voltages as well as to particular transformation voltage ratios. It should be understood that such references are merely exemplary and should not be construed as limiting.

Reference may also sometimes be made herein to particular applications. Such references are intended merely as exemplary and should not be taken as limiting the concepts described herein to the particular application.

Thus, although the description provided herein explains the inventive concepts in the context of particular circuits or a particular application or a particular voltage, those of ordinary skill in the art will appreciate that the concepts equally apply to other circuits or applications or voltages.

Embodiments described herein rely at least in part on the recognition that within the cascade multiplier family, the capacitors can be configured such that the distribution of voltage stress among the capacitors is controlled along with the maximum and minimum voltage stress across the capacitors. This is achieved by creating novel combinations of the series capacitor network configuration and the parallel capacitor network configuration.

Figure 2C:
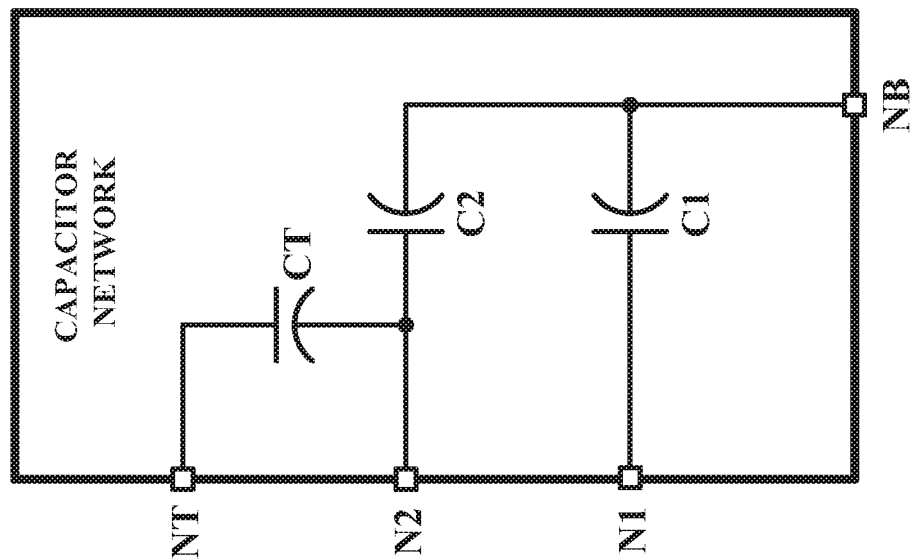
FIG. 2C shows a novel capacitor network configuration.
Figure 2B:
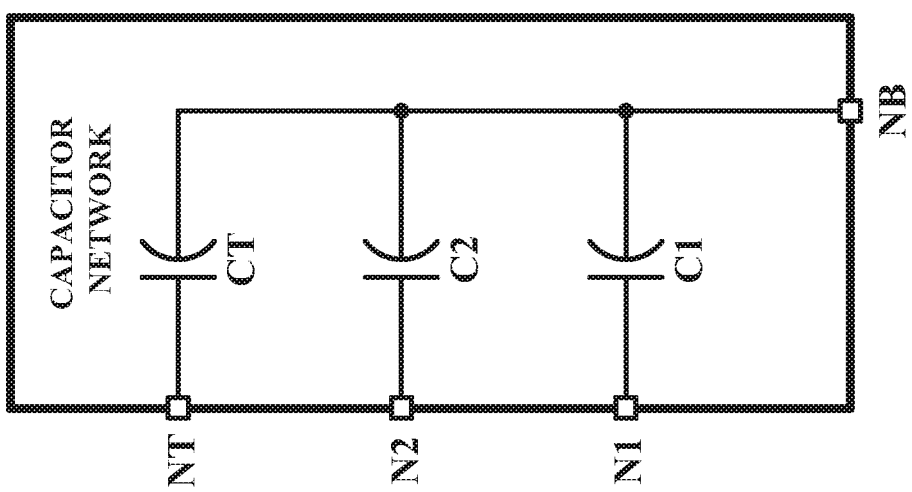
FIG. 2B shows a parallel capacitor network configuration.
Figure 2A:
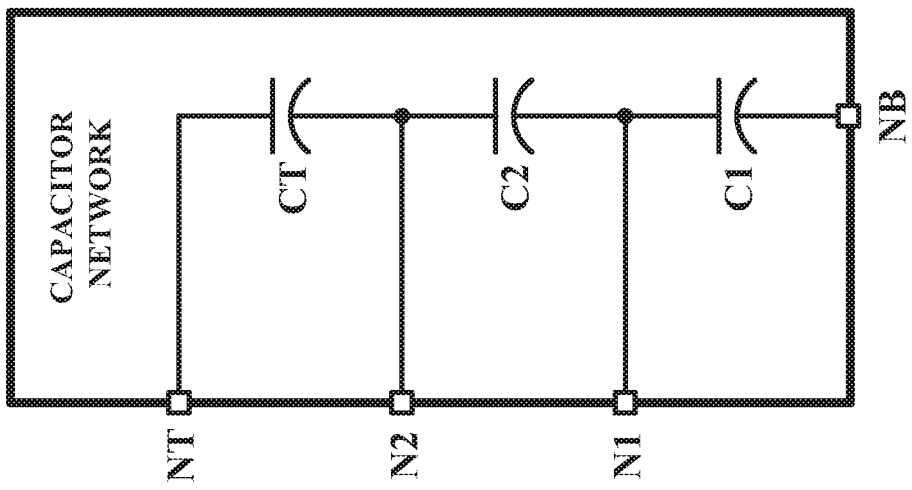
FIG. 2A shows a series capacitor network configuration.

In FIG. 1A, the pump capacitors CA11-CA13 can be grouped together into a capacitor network. Likewise, the DC capacitors CAZ1-CAZ3 can be grouped together into a capacitor network. In general, a cascade multiplier 16A includes two or more capacitor networks. Three different capacitor networks are shown in FIGS. 2A-2C. Each capacitor network includes three capacitors C1, C2, CT, a bottom node NB, a top node NT, and intermediate nodes N1, N2.

The use of the word "coupled" implies that the elements may be directly connected together or may be coupled through one or more intervening elements, such as a resistor, capacitor, or switch. Furthermore, in DC coupling, DC signals are allowed to pass.

In FIG. 2A, the capacitors are connected in series. As used herein, a series capacitor network configuration only includes one capacitor with a terminal DC coupled with the bottom node NB. An example of a series capacitor network configuration is shown in FIG. 1A, where the pump capacitors CA11-CA13 are connected in series with pump node P1.

In contrast, the capacitors in FIG. 2B are connected in parallel. As used herein, a parallel capacitor network configuration only includes capacitors with a terminal DC coupled with the bottom node NB. An example of a parallel capacitor network configuration is shown in FIG. 1B, where the pump capacitors CA11-CA13 are connected in parallel with pump node P1.

FIG. 2C shows a novel embodiment of a capacitor network with three capacitors. The embodiment shown in FIG. 2C includes a first capacitor C1 coupled between a first intermediate node N1 and a bottom node NB, a second capacitor C2 coupled between a second intermediate node N2 and the bottom node NB, and a top capacitor CT coupled between a top node NT and the second intermediate node N2.

In general, a capacitor network includes a set of capacitors, a top node NT, a bottom node NB, and a set of intermediate nodes. The top node NT is at the highest electrical potential, the bottom node NB is at the lowest electrical potential, and the intermediate nodes are at electrical potentials in between that of the top node NT and that of the bottom node NB. Furthermore, the top and bottom nodes NT, NB are coupled to nodes that are either at one state or that alternate between two states, whereas the intermediate nodes are coupled to nodes that alternate between two states.

Figure 3:
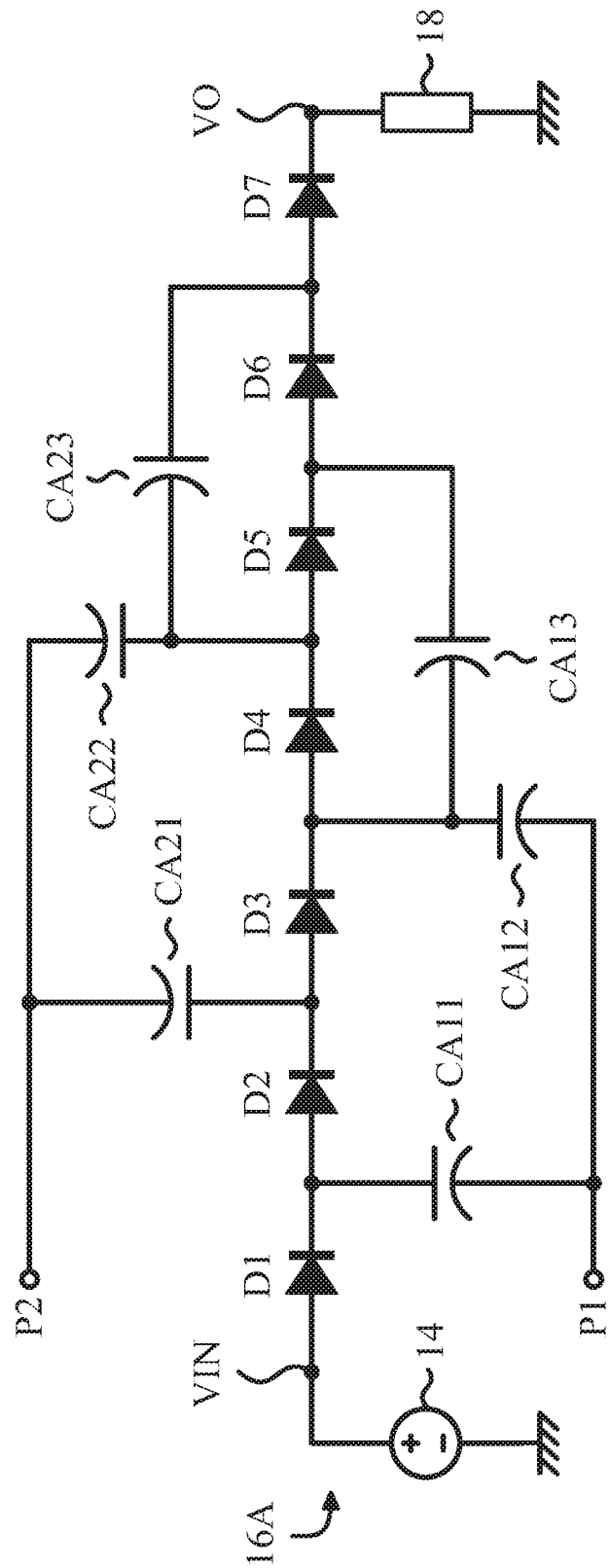
FIG. 3 shows a cascade multiplier with the capacitor network configuration in FIG. 2C.

A cascade multiplier 16A utilizing the novel capacitor network from FIG. 2C is illustrated in FIG. 3. The cascade multiplier 16A is constructed by replacing the first set of pump capacitors CA11-CA13 in FIG. 1B with the capacitor network shown in FIG. 2C and by replacing the second set of pump capacitors CA21-CA23 in FIG. 1B with the pump capacitor network shown in FIG. 2C.

The operation of the cascade multiplier 16A in FIG. 3 is similar to that described in connection with FIG. 1B. The voltage stress across pump capacitors CA11, CA12, CA13 is one volt, three volts and two volts, respectively. Similarly, the voltage stress across pump capacitors CA21, CA22, CA23 is two volt, four volts and two volts, respectively. Therefore, the maximum voltage stress across any pump capacitor in FIG. 3 is four volts, in contrast to six volts in FIG. 1B.

Figure 4C:
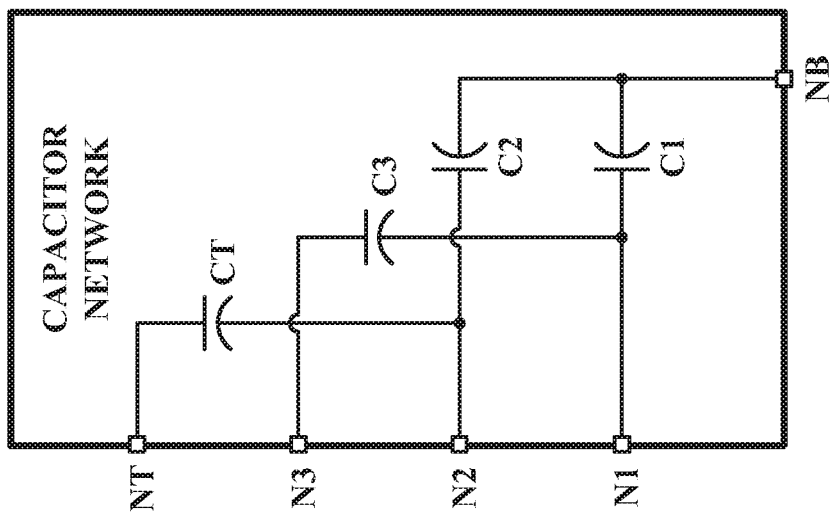
FIGS. 4A-4C show various novel capacitor network configurations.
Figure 4B:
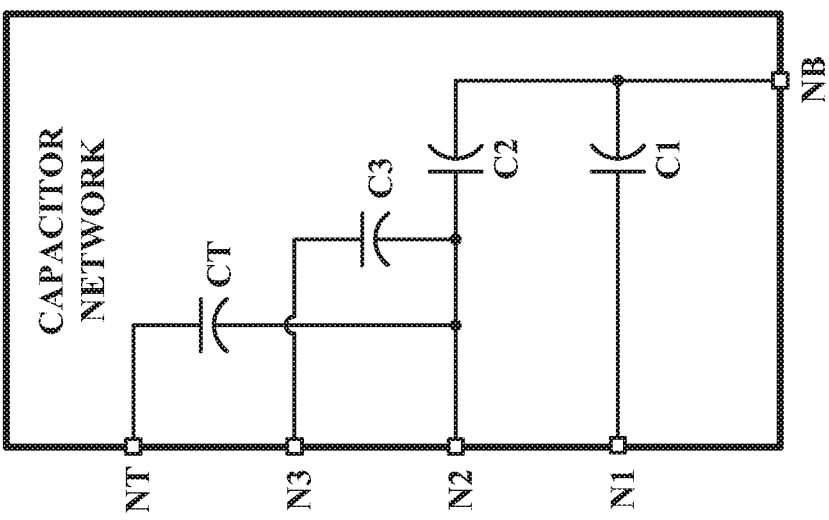
Figure 4A:
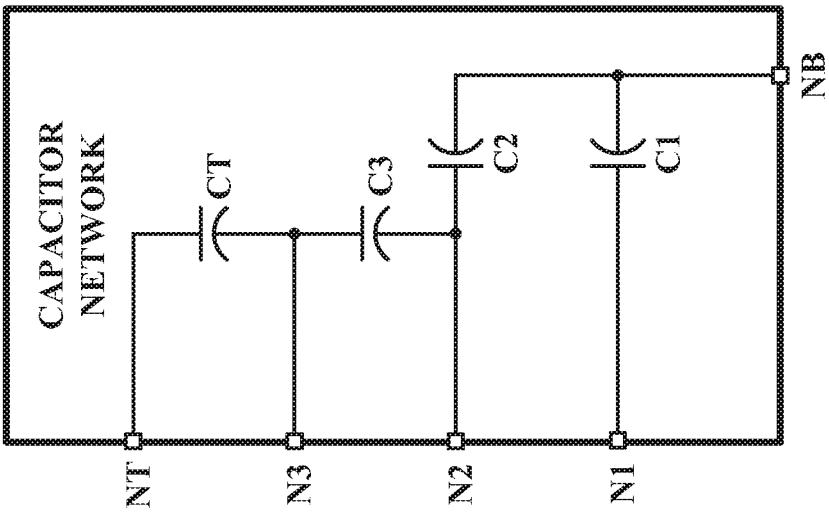

Three additional novel embodiments with a larger number of capacitors are shown in FIGS. 4A-4C. Each capacitor network includes four capacitors C1, C2, C3, CT, a top node NT, a bottom node NB and three intermediate nodes N1-N3. Furthermore, the intermediate nodes N1, N2, N3 and the top node NT are coupled with the positive terminal of capacitors C1, C2, C3, CT, respectively.

A preferred embodiment of a capacitor network is illustrated in FIG. 4A. The capacitor network includes a first capacitor C1 coupled between a first intermediate node N1 and a bottom node NB, a second capacitor C2 coupled between a second intermediate node N2 and the bottom node NB, a third capacitor C3 coupled between a third intermediate node N3 and the second switch node N2, and a top capacitor CT coupled between a top node NT and the third intermediate node N3.

Another preferred embodiment of a capacitor network is illustrated in FIG. 4B. The capacitor network includes a first capacitor C1 coupled between a first intermediate node N1 and a bottom node NB, a second capacitor C2 coupled between a second intermediate node N2 and the bottom node NB, a third capacitor C3 coupled between a third intermediate node N3 and the second intermediate node N2, and a top capacitor CT coupled between a top node NT and the second intermediate node N2.

One more preferred embodiment of a capacitor network is illustrated in FIG. 4C. The capacitor network includes a first capacitor C1 coupled between a first intermediate node N1 and a bottom node NB, a second capacitor C2 coupled between a second intermediate node N2 and the bottom node NB, a third capacitor C3 coupled between a third intermediate node N3 and the first intermediate node N1, and a top capacitor CT coupled between a top node NT and the second intermediate node N2.

Generally, the positive terminal of each capacitor in the capacitor network is either coupled with a top node NT or an intermediate node. For example, the positive terminal of a top capacitor CT is coupled with the top node NT, the positive terminal of a first capacitor C1 is coupled with a first intermediate node N1, the positive terminal of a second capacitor C2 is coupled with a second intermediate node N2, and so on. The negative terminal of each capacitor in the capacitor network is coupled with any other capacitor terminal within the capacitor network that is at a lower voltage than its positive terminal.

In addition to the three previously described preferred embodiments shown in FIGS. 4A-4C, there are numerous other possible configurations of the novel capacitor network with four capacitors. The number of possible configurations of the capacitor network is N factorial, where N is the number of capacitors in the capacitor network. This includes the series case shown in FIG. 2A and the parallel case shown in FIG. 2B. Therefore, the number of novel capacitor network configurations is N factorial minus two.

Four generic cascade multipliers 16A are illustrated in FIG. 5A-8A. A particular implementation of each generic cascade multiplier 16A utilizing a novel capacitor network is shown in FIG. 5B-8B. In each implementation, the pump capacitor networks 24A, 24B, 26A, 26B use one of the four novel capacitor networks shown in FIG. 2C and FIG. 4A-4C. Furthermore, the DC capacitor network 28A in FIG. 5B uses the novel capacitor network shown in FIG. 4A.

Figure 5A:
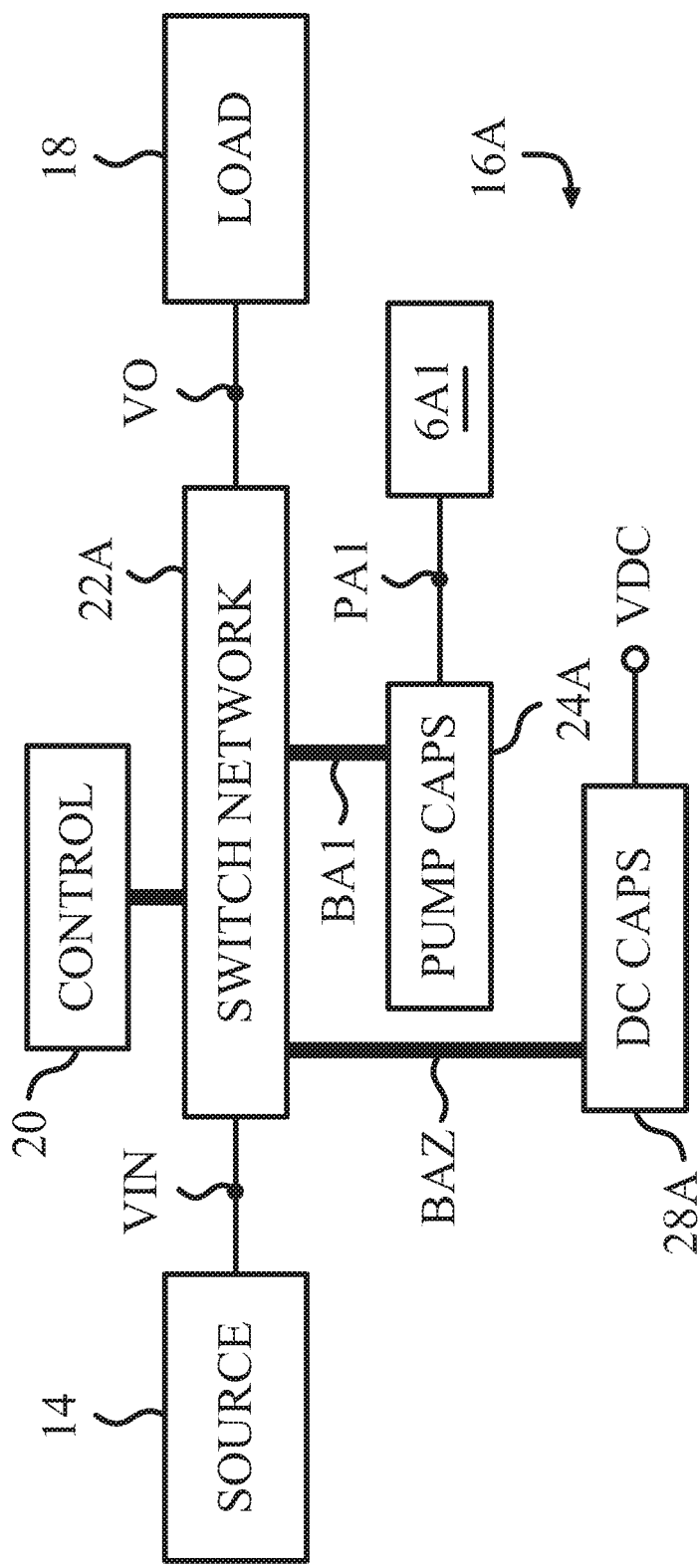
FIG. 5A shows a block diagram of a single-phase cascade multiplier.

A block diagram of a generic single-phase cascade multiplier 16A that includes the circuit in FIG. 1A as one species is illustrated in FIG. 5A. The generic single-phase cascade multiplier 16A includes at least four components: a switch network 22A, a pump capacitor network 24A, a DC capacitor network 28A, and a phase pump 6A1. Additionally, a controller 20 may be used to generate the appropriate control signals.

The input of the switch network 22A is coupled with a voltage source 14 while the output of the switch network 22A is coupled with a load 18. The switch network 22A includes a string of switches connected in series. At least one capacitor is coupled with a node between adjacent switches in the switch network 22A.

In the pump capacitor network 24A, one side of each pump capacitor is coupled with the switch network 22A through an pump bus BA1. The other side of each pump capacitor is coupled with the phase pump 6A1 at a pump node PA1. Similarly, in the DC capacitor network 28A, one side of each DC capacitor is coupled with the switch network 22A through a DC bus BZA. The other side of each DC capacitor is coupled with a DC voltage. One convenient choice of a DC voltage comes from the output of the cascade multiplier 16A.

The phase pump 6A1 has a first state and a second state. In the first state, the output of the phase pump 6A1 is low and in the second state, the output of the phase pump 6A1 is high. During operation, the phase pump 6A1 cycles between the first state and the second state at a specific frequency.

The switch network 22A and phase pump 6A1 are synchronized, such that packages of charge are shuttled along the switch network 22A as the pump capacitor network 24A is repeatedly being charged and discharged by the phase pump 6A1. Charge transfers back and forth between the pump capacitor network 24A and the DC capacitor network 28A. It takes multiple cycles for the initial charge from the voltage source 14 to reach the load 18. The pump capacitor network 24A provides the voltage transformation, whereas, the DC capacitor network 28A serves as intermediate storage for the pump capacitor network 24A.

The generic single-phase cascade multiplier 16A shown in FIG. 5A is a generalization of the cascade multiplier 16A in FIG. 1A. Each component in FIG. 5A corresponds to a counterpart in FIG. 1A. The switch network 22A in FIG. 5A corresponds to the series connection of diodes D1-D6 in FIG. 1A. The pump capacitor network 24A in FIG. 5A corresponds to the series configuration of pump capacitors CA11-CA13 in FIG. 1A. The DC capacitor network 28A in FIG. 5A corresponds to the series configuration of DC capacitors CZ1-CZ3 in FIG. 1A. Additionally, the phase pump 6A1 in FIG. 5A is not shown in FIG. 1A.

The diodes D1-D6 in FIG. 1A can be replaced by switches under the following circumstance. The switches are turned on when their corresponding diodes would have allowed current to flow and turned off when their corresponding diodes would have suppressed current flow. As used herein, the suppression of current means the flow of current is either eliminated or attenuated.

Figure 5B:
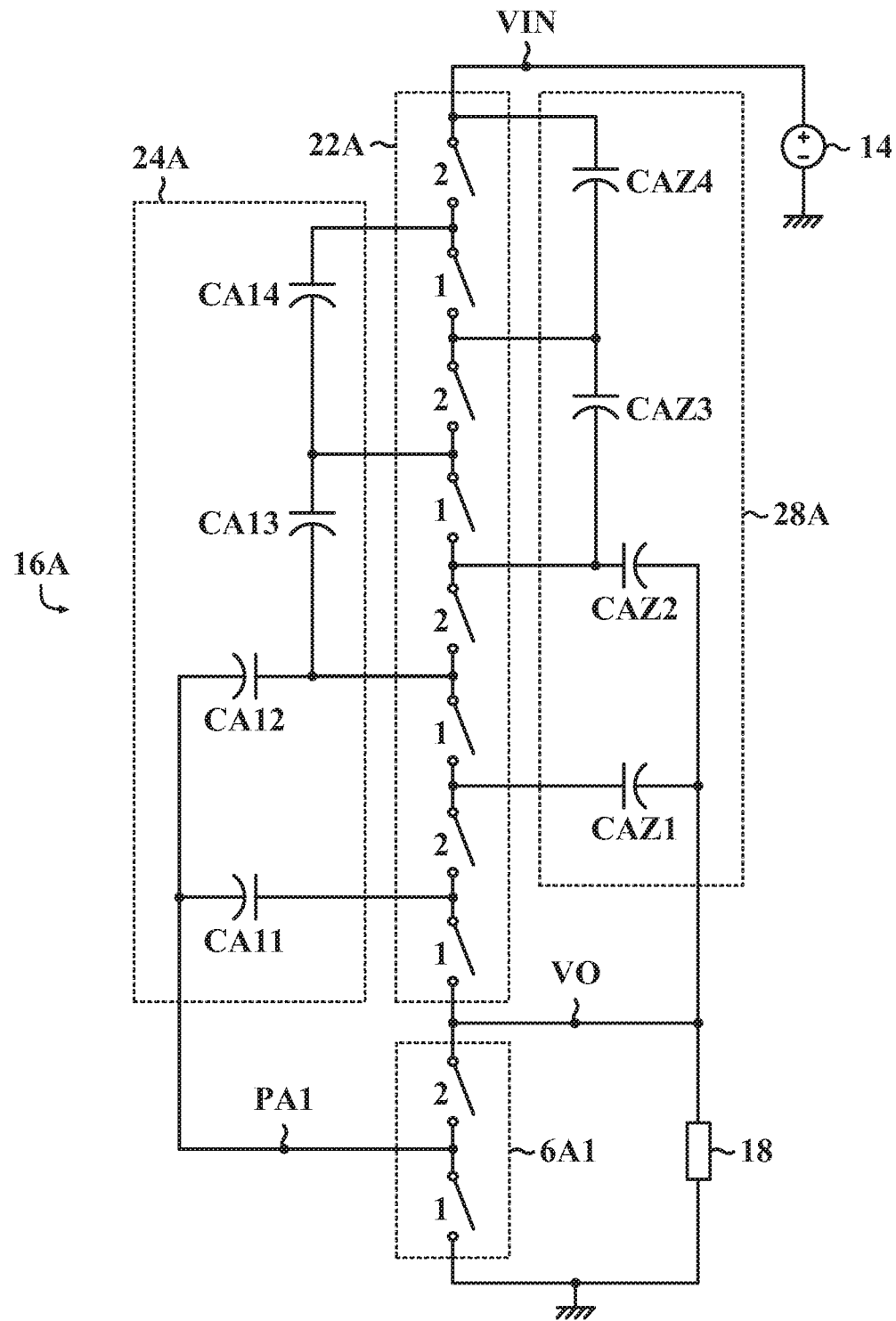
FIG. 5B shows a particular implementation of the cascade multiplier shown in FIG. 5A.

FIG. 5B is a novel implementation of the cascade multiplier 16A illustrated more generally in FIG. 5A. The cascade multiplier 16A receives an input voltage VIN from the voltage source 14 and produces an output voltage VO that is one-fifth of the input voltage VIN. The pump capacitor network 24A and the DC capacitor network 28A utilize the capacitor network configuration shown in FIG. 4A. The pump capacitor network 24A includes first, second, third, and fourth pump capacitors CA11, CA12, CA13, CA14 that are responsible for providing voltage transformation. In contrast, the DC capacitor network 28A includes first, second, third, and fourth DC capacitors CAZ1, CAZ2, CAZ3, CAZ4 that are responsible for generating DC voltage levels.

All of the devices in the switch network 22A and phase pump 6A1 are implemented using switches. The phase pump 6A1 cycles between a first interval and a second interval at a specific frequency. The voltage at the pump node PA1 during the first interval is ground. In contrast, the voltage at the pump node PA1 during the second interval is the output voltage VO.

Assuming the input voltage VIN is equal to five volts, the operation of the circuit is as follows. During the first interval, the switches labeled "1" are closed, the switches labeled "2" are open, and the voltage at the pump node PA1 is zero volts. As a result, the pump capacitors CA11-CA14 are being discharged while the DC capacitors CAZ1-CAZ4 are being charged.

During the second interval following the first interval, the switches labeled "1" are open, the switches labeled "2" are closed, and the voltage at the pump node PA1 is one volt. Consequently, the pump capacitors CA11-CA14 are being charged while the DC capacitors CAZ1-CAZ4 are being discharged.

The voltage stress across the second pump capacitor CA12 and the second DC capacitor CAZ2 is two volts while the voltage stress across each remaining capacitor is one volt. Consequently, the maximum voltage stress is two volts with a fairly uniform distribution of voltage stress among the pump capacitors CA11-CA14 and the DC capacitors CAZ1-CAZ4.

Figure 6A:
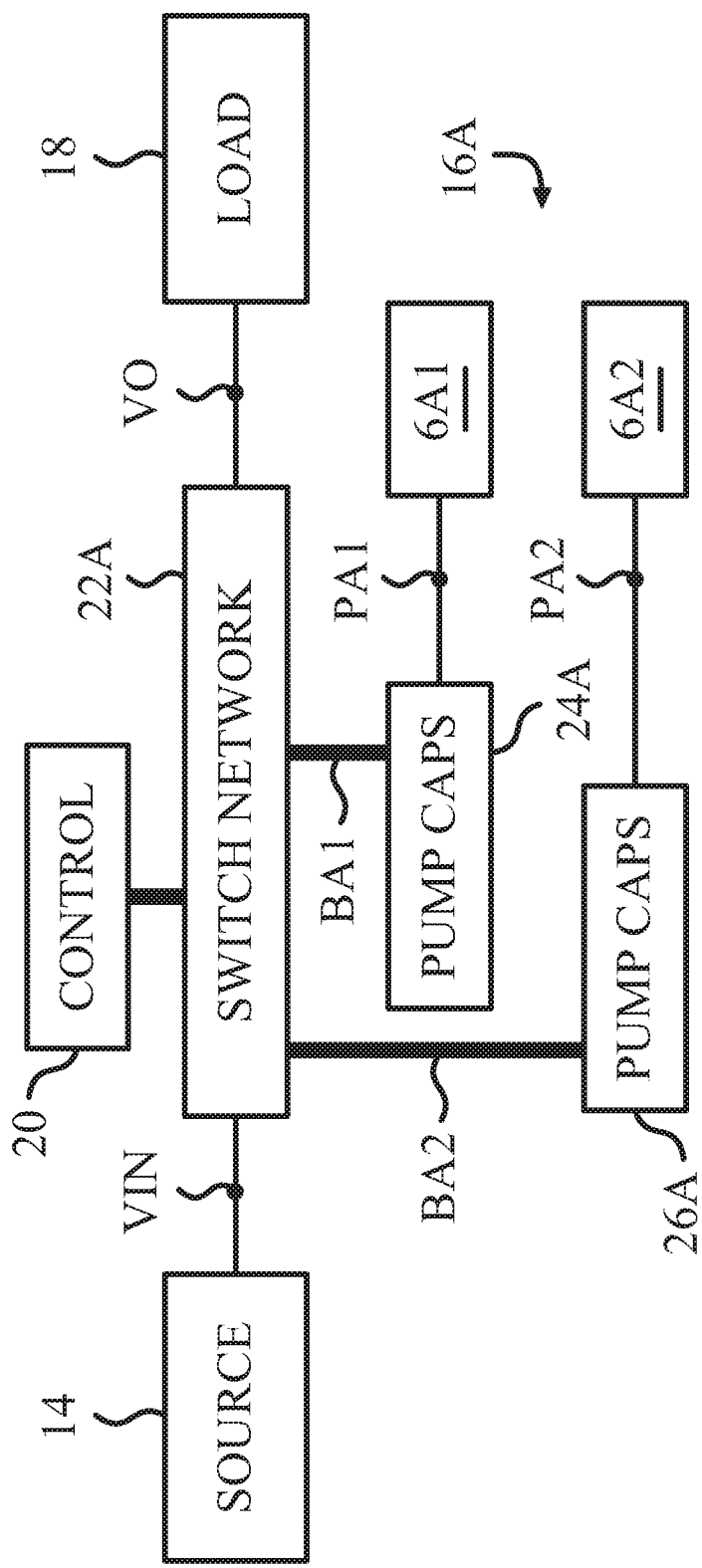
FIG. 6A shows an alternative block diagram of a single-phase cascade multiplier.

A block diagram of another generic single-phase cascade multiplier 16A is constructed by replacing the DC capacitor network 28A in FIG. 5A with a second pump capacitor network 26A and a second phase pump 6A2 as illustrated FIG. 6A. In addition to the second pump capacitor network 26A and the second phase pump 6A2, the resulting generic single-phase cascade multiplier 16A includes a switch network 22A, a first pump capacitor network 24A, and a first phase pump 6A1. Additionally, a controller 20 may be used to generate the appropriate control signals.

The input of the switch network 22A is coupled with a voltage source 14 while the output of the switch network 22A is coupled with a load 18. The switch network 22A includes a string of switches connected in series. At least one capacitor is coupled with a node between adjacent switches in the switch network 22A.

In the first pump capacitor network 24A, one side of each pump capacitor is coupled with the switch network 22A through a first pump bus BA1. The other side of each pump capacitor in the first pump capacitor network 24A is coupled with the first phase pump 6A1 at a first pump node PA1. Similarly, in the second pump capacitor network 26A, one side of each pump capacitor is coupled with the switch network 22A through a second pump bus BA2. The other side of each pump capacitor in the second pump capacitor network 26A is coupled with the second phase pump 6A2 at a second pump node PA2.

The first and second phase pumps 6A1, 6A2 have a first state and a second state. In the first state, the output of the first phase pump 6A1 is low and the output of the second phase pump 6A2 is high. In the second state, the output of the first phase pump 6A1 is high and the output of the second phase pump 6A2 is low. During operation, the phase pumps 6A1, 6A2 cycle between the first state and the second state at a specific frequency.

The switch network 22A, the first phase pump 6A1, and the second phase pump 6A2 are synchronized such that packages of charge are shuttled along the switch network 22A as the first and second pump capacitor networks 24A, 26A are repeatedly being charged and discharged by the first and second phase pumps 6A1, 6A2, respectively. Charge transfers back and forth between the first pump capacitor network 24A and the second pump capacitor network 26A. It takes multiple cycles for the initial charge from the voltage source 14 to reach the load 18.

The generic single-phase cascade multiplier 16A shown in FIG. 6A is a generalization of the cascade multiplier 16A in FIG. 1B. Each component in FIG. 6A corresponds to a counterpart in FIG. 1B. The switch network 22A in FIG. 6A corresponds to the series connection of diodes D1-D7 in FIG. 1B. The first pump capacitor network 24A in FIG. 6A corresponds to the parallel configuration of pump capacitors CA11-CA13 in FIG. 1B. The second pump capacitor network 26A in FIG. 6A corresponds to the parallel configuration of pump capacitors CA21-CA23 in FIG. 1B. Lastly, the first and second phase pumps 6A1, 6A2 in FIG. 6A are not shown in FIG. 1B.

The diodes D1-D7 in FIG. 1B are specific implementations of switches. A diode has an on-state and an off-state, as does a switch. To produce a more general representation, the diodes D1-D7 in FIG. 1B can be replaced by switches. Each switch needs to be controlled properly for the cascade multiplier 16A to operate.

Figure 6B:
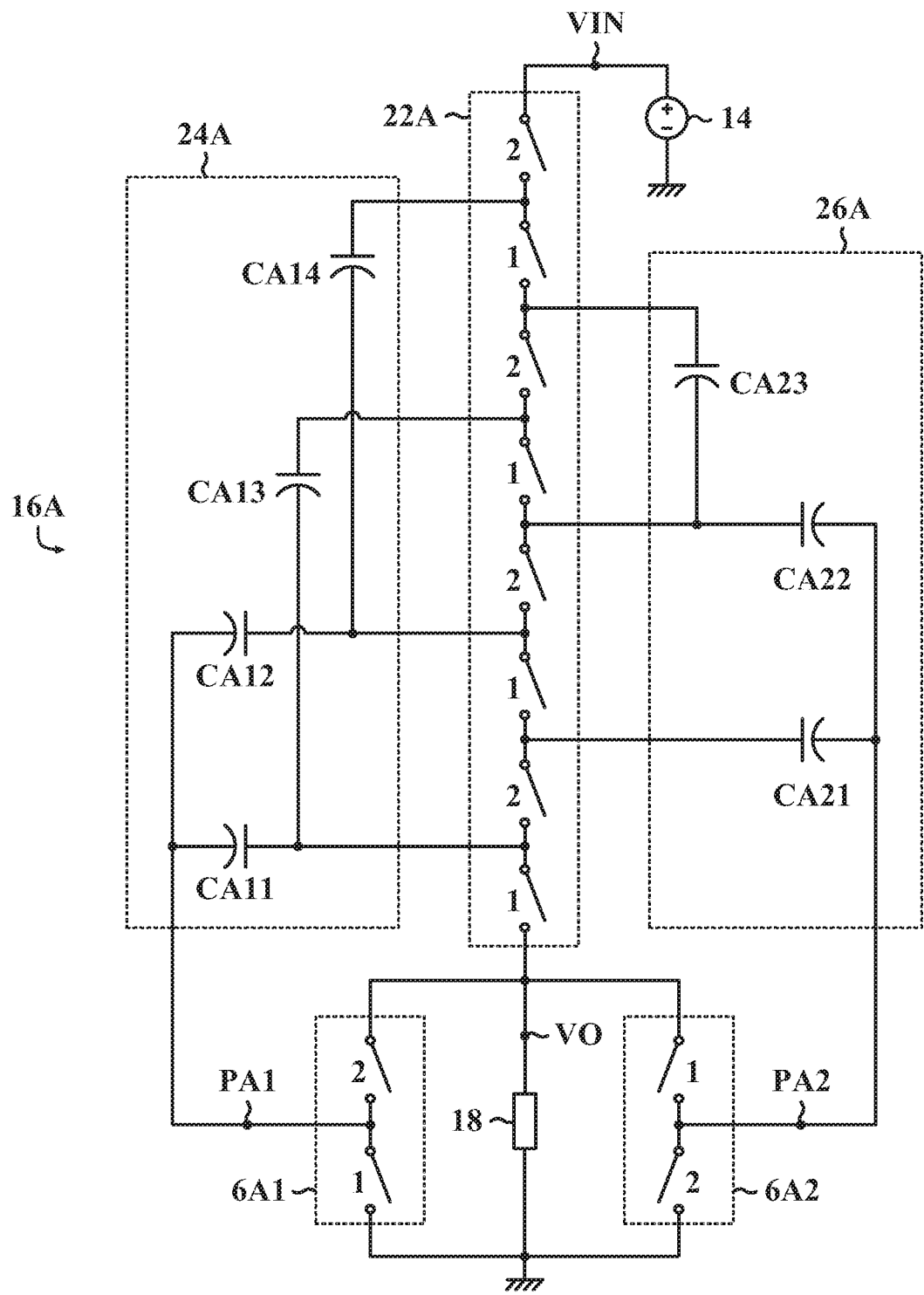
FIG. 6B shows a particular implementation of the cascade multiplier shown in FIG. 6A.

FIG. 6B is a novel implementation of the cascade multiplier 16A illustrated more generally in FIG. 6A. The cascade multiplier 16A receives an input voltage VIN from the voltage source 14 and produces an output voltage VO that is one-eighth of the input voltage VIN. The first pump capacitor network 24A utilizes the capacitor network configuration shown in FIG. 4C while the second pump capacitor network 26A utilizes the capacitor network configuration shown in FIG. 2C. The first pump capacitor network 24A includes first, second, third, and fourth pump capacitors CA11, CA12, CA13, CA14. Likewise, the second pump capacitor network 26A includes fifth, sixth, and seventh pump capacitors CA21, CA22, CA23.

All of the devices in the switch network 22A, the first phase pump 6A1, and the second phase pump 6A2 are implemented using switches. The first and second phase pumps 6A1, 6A2 cycle between first and second intervals at a specific frequency. During the first interval, the voltage at the first pump node PA1 is ground and the voltage at the second pump node PA2 is the output voltage VO. In contrast, during the second interval, the voltage at the first pump node PA1 is the output voltage VO and the voltage at the second pump node PA2 is ground.

Assuming the input voltage VIN is equal to eight volts, the operation of the circuit is as follows. During the first interval, the switches labeled "1" are closed, the switches labeled "2" are open, the voltage at the first pump node PA1 is zero volts, and the voltage at the second pump node PA2 is one volt. As a result, the pump capacitors CA11-CA14 are being discharged while the pump capacitors CA21-CA23 are being charged.

During the second interval following the first interval, the switches labeled "1" are open, the switches labeled "2" are closed, the voltage at the first node PA1 is one volt, and the voltage at the second node PA2 is zero volts. Consequently, the pump capacitors CA11-CA14 are being charged while the pump capacitors CA21-CA23 are being discharged.

The voltage stress across the first, second, fifth, and seventh pump capacitors CA11, CA12, CA21, CA23 is one volt, three volts, two volts, and two volts, respectively. While the voltage stress across each remaining pump capacitor is four volts. Consequently, the maximum voltage stress is four volts with a moderate distribution of voltage stress among the pump capacitors.

In the single-phase cascade multipliers 16A illustrated in FIGS. 5A, 6A, there are periods of time during which the voltage source 14 is not coupled with the load 18. However, if two single-phase cascade multipliers 16A are operated in parallel and one hundred and eighty degrees out of phase, then the voltage source 14 will always be coupled with the load 18 at any given time. This configuration is referred to as a two-phase or dual-phase cascade multiplier 16A.

Figure 7A:
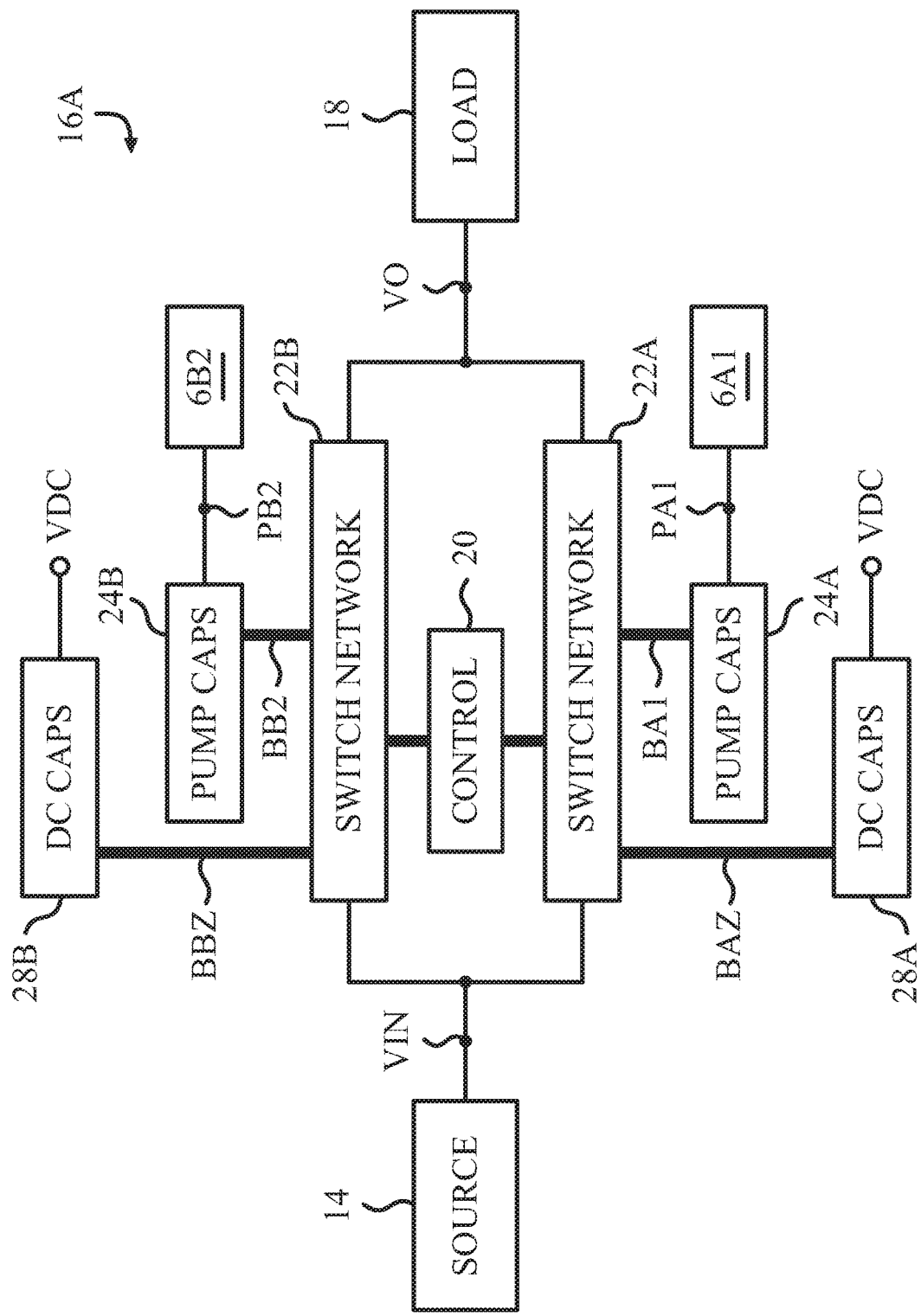
FIG. 7A shows a block diagram of a dual-phase cascade multiplier.

Based upon the generic single-phase cascade multiplier 16A in FIG. 5A, a generic dual-phase cascade multiplier 16A can be constructed as shown in FIG. 7A. The generic dual-phase cascade multiplier 16A includes a first switch network 22A, a second switch network 22B, a first pump capacitor network 24A, a second pump capacitor network 24B, a first phase pump 6A1, a second phase pump 6B2, a first DC capacitor network 28A, and a second DC capacitor network 28B. Additionally, a controller 20 may be used to generate the appropriate control signals.

The first pump capacitor network 24A is coupled with the first phase pump 6A1 at a first pump node PA1 and with the first switch network 22A through a first pump bus BA1. Similarly, the second pump capacitor network 24B is coupled with the second phase pump 6B2 at a second pump node PB2 and with the second switch network 22B through a second pump bus BB2. Furthermore, the first DC capacitor network 28A is coupled with the first switch network 22A through a first DC bus BAZ and with a first DC voltage. Meanwhile, the second DC capacitor network 28B is coupled with the second switch network 22B through a second DC bus BBZ and with a second DC voltage. As before, one convenient choice of the first and/or second DC voltage comes from the output of the cascade multiplier 16A.

The output of the first phase pump 6A1 is provided at the first pump node PA1 and the output of the second phase pump 6B2 is provided at the second pump node PB2. The signal at the first pump node PA1 and the signal at the second pump node PB2 are one hundred and eighty degrees out of phase. Consequently, whenever the first pump node PA1 is high, the second pump node PB2 is low, and vice versa.

Figure 7B:
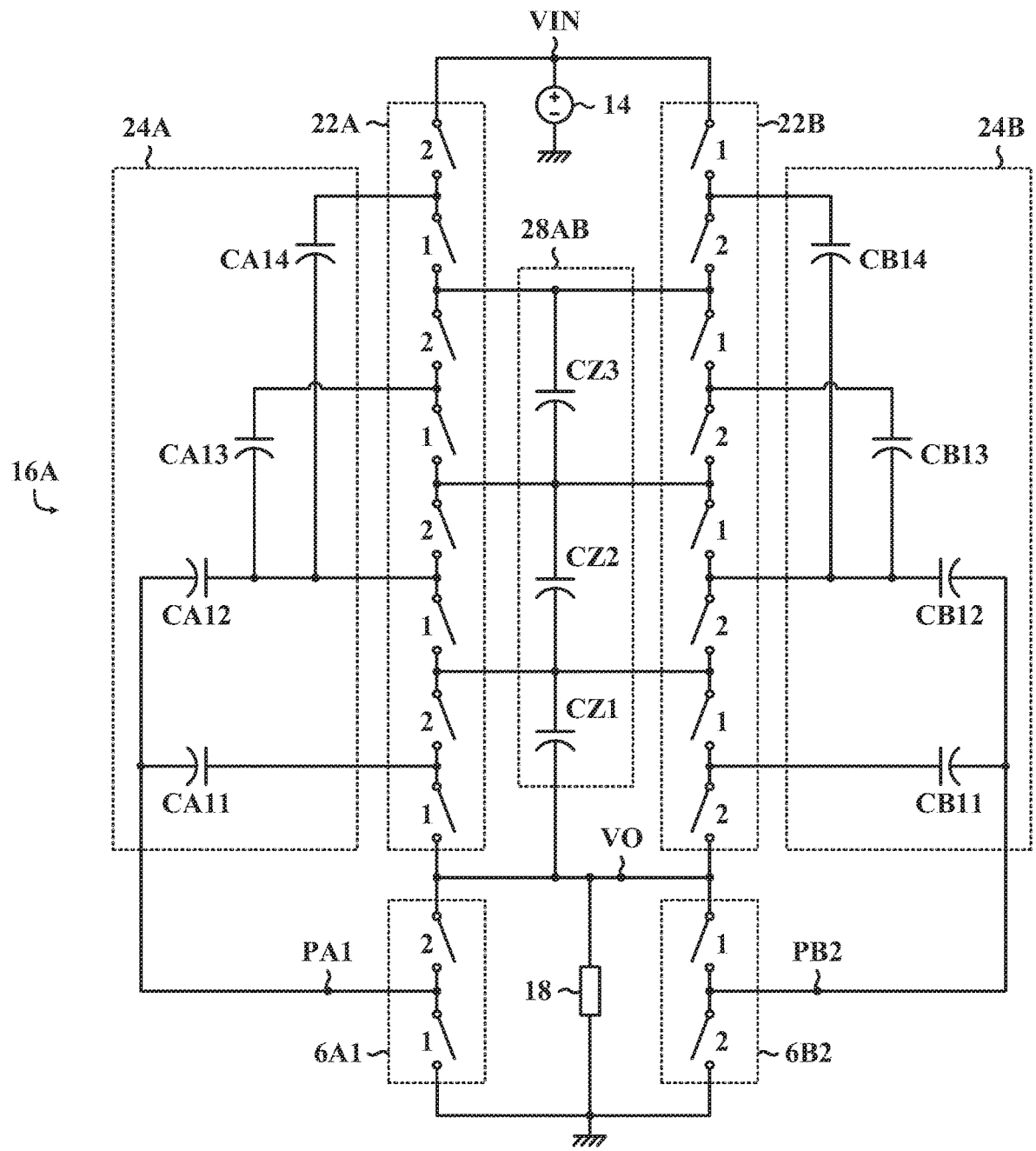
FIG. 7B shows a particular implementation of the cascade multiplier shown in FIG. 7A.

FIG. 7B is a novel implementation of the generic dual-phase cascade multiplier 16A illustrated in FIG. 7A that utilizes the capacitor network configuration shown in FIG.

4B. The first pump capacitor network 24A includes first, second, third, and fourth pump capacitors CA11, CA12, CA13, CA14. Likewise, the second pump capacitor network 24B includes fifth, sixth, seventh, and eighth pump capacitors CB11, CB12, CB13, CB14.

The first and second DC capacitor networks 28A, 28B in FIG. 7A can be merged if the voltage across the corresponding DC capacitors inside the first and second DC capacitor networks 28A, 28B are at the same DC values. Therefore, the first and second DC capacitor networks 28A, 28B in FIG. 7A are replaced by a third DC capacitor network 28AB in FIG. 7B. The third DC capacitor network 28AB includes first, second, and third DC capacitors CZ1, CZ2, CZ3. Similar to the first and second DC capacitor networks 28A, 28B, the third DC capacitor network 28AB generates DC voltage levels.

The dual-phase cascade multiplier 16A receives an input voltage VIN from a voltage source 14 and maintains an output voltage VO that is one-fifth of the input voltage VIN. All of the devices in the first switch network 22A, the second switch network 22B, the first phase pump 6A1, and the second phase pump 6B2 are implemented using switches. The first and second phase pumps 6A1, 6B2 use the output voltage VO and ground to produce a voltage with first and second intervals repeated at a specific frequency.

Assuming the input voltage VIN is equal to five volts, the operation of the circuit is as follows. During the first interval, the switches labeled "1" are closed, the switches labeled "2" are open, the voltage at the first pump node PA1 is zero volts, and the voltage at the second pump node PB2 is one volt. As a result, the pump capacitors CA11-CA14 are being discharged while the pump capacitors CB11-CB14 are being charged. Ideally, the DC capacitors CZ1-CZ3 are neither being charged nor being discharged because the discharging currents of the first, second, third, and fourth pump capacitors CA11, CA12, CA13, CA14 match the charging currents of the fifth, sixth, seventh, and eighth pump capacitors CB11, CB12, CB13, CB14, respectively.

During the second interval following the first interval, the switches labeled "1" are open, the switches labeled "2" are closed, the voltage at the first pump node PA1 is one volt, and the voltage at the second pump node PB2 is zero volts. Consequently, the pump capacitors CA11-CA14 are being charged while the pump capacitors CB11-CB14 are being discharged. Ideally, the DC capacitors CZ1-CZ3 are neither being charged nor being discharged because the charging currents of the first, second, third, and fourth pump capacitors CA11, CA12, CA13, CA14 match the discharging currents of the fifth, sixth, seventh, and eighth pump capacitors CB11, CB12, CB13, CB14, respectively.

The voltage stress across the first, third, fifth, and seventh pump capacitors CA11, CA13, CB11, CB13 is one volt while the voltage stress across each remaining capacitor is two volts. Consequently, the maximum voltage stress is two volts with a fairly uniform distribution of voltage stress among the pump capacitors.

Figure 8A:
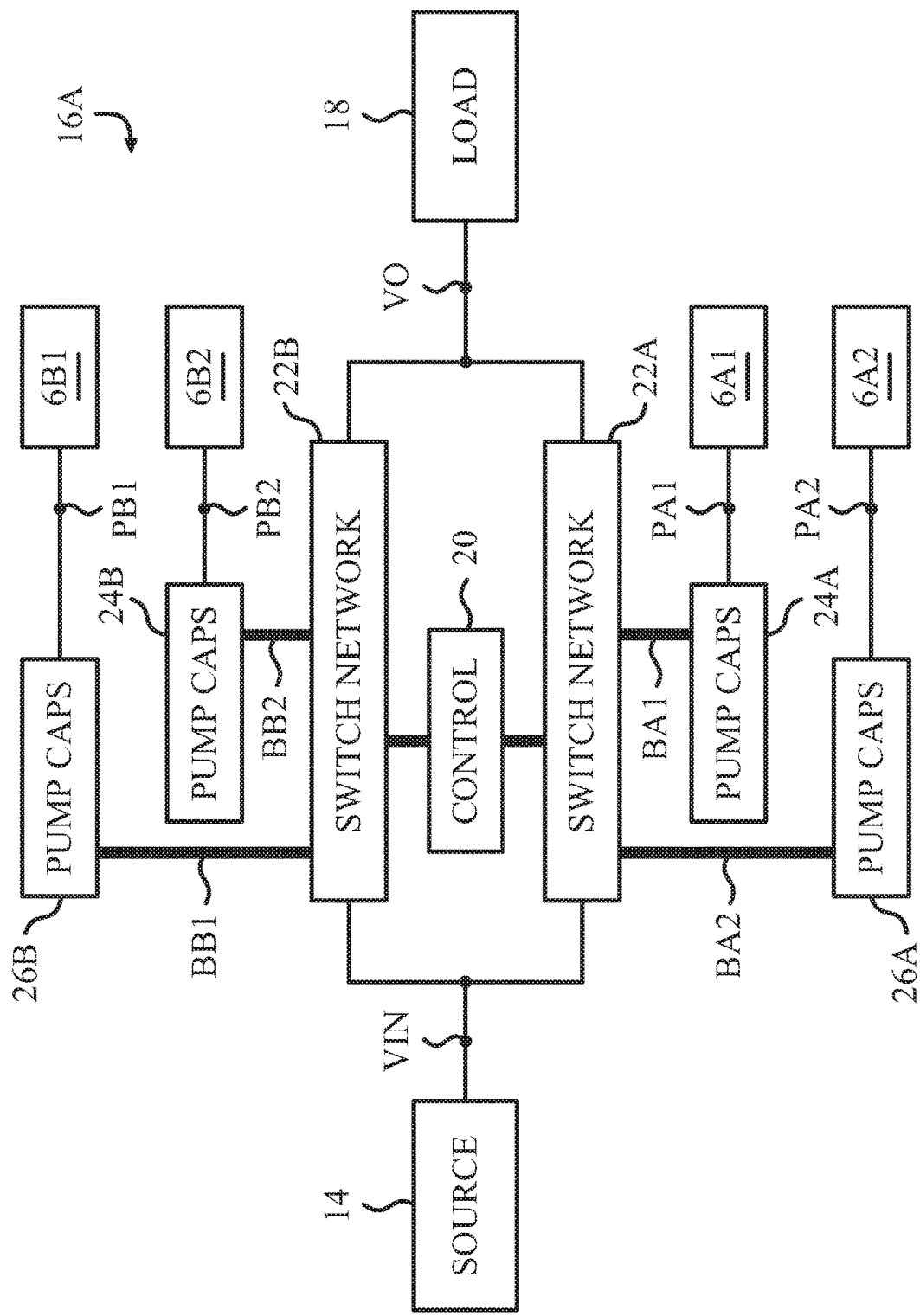
FIG. 8A shows an alternative block diagram of a dual-phase cascade multiplier.

Another generic dual-phase cascade multiplier 16A is shown in FIG. 8A. The implementation in FIG. 8A is based upon the generic single-phase cascade multiplier 16A in FIG. 6A. Therefore, the generic dual-phase cascade multiplier 16A includes a first switch network 22A, a second switch network 22B, a first pump capacitor network 24A, a second pump capacitor network 26A, a third pump capacitor network 24B, a fourth pump capacitor network 26B, a first phase pump 6A1, a second phase pump 6A2, a third phase pump 6B2, and a fourth phase pump 6B1. Additionally, a controller 20 may be used to generate the appropriate control signals.

The first pump capacitor network 24A is coupled with the first phase pump 6A1 at a first pump node PA1 and with the first switch network 22A through a first pump bus BA1. Similarly, the second pump capacitor network 26A is coupled with the second phase pump 6A2 at a second pump node PA2 and with the first switch network 22A through a second pump bus BA2. Furthermore, the third pump capacitor network 24B is coupled with the third phase pump 6B2 at a third pump node PB2 and with the second switch network 22B through a third pump bus BB2. Meanwhile, the fourth pump capacitor network 26B is coupled with the fourth phase pump 6B1 at a fourth pump node PB1 and with the second switch network 22B through a fourth pump bus BB1.

The outputs of the first, second, third, and fourth phase pumps 6A1, 6A2, 6B2, 6B1 are provided at the first, second, third, and fourth pump nodes PA1, PA2, PB2, PB1, respectively. The signals at the first and second pump nodes PA1, PA2 are opposite in phase. Similarly, the signals at the third and fourth pump nodes PB2, PB1 are opposite in phase. However, the signals at the first and fourth pump nodes PA1, PB1 are in phase. Therefore, whenever the first and fourth pump nodes PA1, PB1 are high, the second and third pump nodes PA2, PB2 are low, and vice versa. Furthermore, because of the phase alignment, the first and fourth phase pumps 6A1, 6B1 can be the same physical pump or different pumps that are in phase. Likewise, the second and third phase pumps 6A2, 6B2 can be the same physical pump or different pumps that are in phase.

Figure 8B:
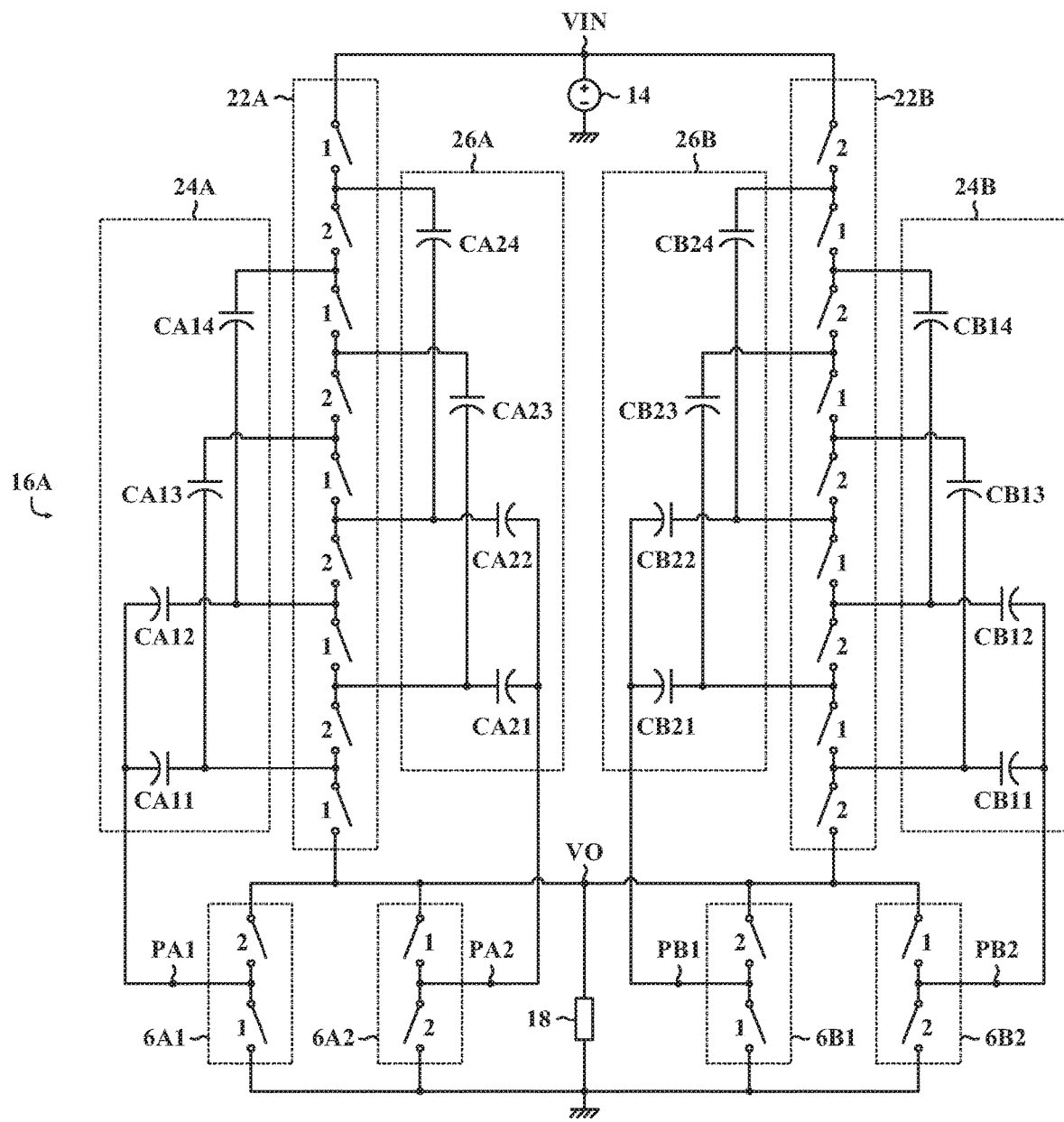
FIG. 8B shows a particular implementation of the cascade multiplier shown in FIG. 8A.

FIG. 8B is a novel implementation of the generic dual-phase cascade multiplier 16A illustrated in FIG. 8A that utilizes the capacitor network configuration shown in FIG. 4C. The first pump capacitor network 24A includes first, second, third, and fourth pump capacitors CA11, CA12, CA13, CA14. The second pump capacitor network 26A includes fifth, sixth, seventh, and eight pump capacitors CA21, CA22, CA23, CA24. The third pump capacitor network 24B includes ninth, tenth, eleventh, and twelfth pump capacitors CB11, CB12, CB13, CB14. Lastly, the fourth pump capacitor network 26B includes thirteenth, fourteenth, fifteenth, and sixteenth pump capacitors CB21, CB22, CB23, CB24.

The dual-phase cascade multiplier 16A receives an input voltage from a voltage source 14 and maintains an output voltage VO that is one-ninth of the input voltage VIN. All of the devices in the first switch network 22A, the second switch network 22B, and the phase pumps 6A1, 6A2, 6B2, 6B1 are implemented using switches. The four phase pumps 6A1, 6A2, 6B2, 6B1 use the output voltage VO and ground to produce voltages with first and second intervals repeated at a specific frequency.

Assuming the input voltage VIN is equal to nine volts, the operation of the circuit is as follows. During the first interval, the switches labeled "1" are closed, the switches labeled "2" are open, the voltage at the first and fourth pump nodes PA1, PB1 is zero volts, and the voltage at the second and third pump nodes PA2, PB2 is one volt. As a result, the pump capacitors CA11-CA14, CB21-CB24 are being discharged while the pump capacitors CA21-CA24, CB11-CB14 are being charged.

During the second interval following the first interval, the switches labeled "1" are open, the switches labeled "2" are closed, the voltage at the first and fourth pump nodes PA1, PB1 is one volt, and the voltage at the second and third pump nodes PA2, PB2 is zero volts.

Consequently, the pump capacitors CA11-CA14, CB21-CB24 are being charged while the pump capacitors CA21-CA24, CB11-CB14 are being discharged.

The voltage stress across the first and ninth pump capacitors CA11, CB11 is one volt. The voltage stress across the second and tenth pump capacitors CA12, CB12 is three volts. The voltage stress across the fifth and thirteenth pump capacitors CA21, CB21 is two volts. Lastly, the voltage stress across each remaining pump capacitor is four volts. Consequently, the maximum voltage stress is four volts with a moderate distribution of voltage stress among the pump capacitors.

In general, the switches included within a first and second switch network 22A, 22B have an on-state and an off-state. Likewise, the switches included within a first phase pump 6A1, a second phase pump 6A2, a third phase pump 6B2, and so on, also have an on-state and an off-state. In the on-state, current flows through the switch, whereas in the off-state, the current through the switch is suppressed. Examples of such switches include diodes, transistors, vacuum tubes, and micro-mechanical relays.

Even though FIGS. 5A, 6A, 7A, and 8A illustrate four generic types of switched capacitor converters within the cascade multiplier family, there are other possible variations. For instance, one of ordinary skill in the art would appreciate the possibility of increasing the number of phases beyond two or dynamically reconfiguring the transformation ratio of the cascade multiplier 16A.

Additionally, other circuit implementations in addition to those shown in FIGS. 5B, 6B, 7B, and 8B are possible. For example, each circuit implementation was designed to convert a higher input voltage VIN to a lower output voltage VO. However, one of ordinary skill in the art would understand how to create corresponding circuit implementations that convert a lower input voltage VIN to a higher output voltage VO.

Furthermore, a dead-time interval can also be included between the first interval and the second interval and subsequently between the second interval and the first interval. To ensure a clean transition, all of the switches are in the off-state during the dead-time interval. This technique is often referred to as "break before make".

Various features, aspects, and embodiments of switched capacitor converters have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications. Additionally, the terms and expression which have been employed herein are used as terms of description and not of limitation. There is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

Having described the invention, and a preferred embodiment thereof, what is claimed as new and secured by Letters Patent is:

1. An apparatus having an input port and an output port, the apparatus comprising:
    a clock to generate one or more timing signals;
    a controller to implement a dead-time interval based, at least in part, on the one or more timing signals; and
    a multi-phase switched capacitor converter to be coupled between the input port and the output port, the switched capacitor converter comprising a DC capacitor arrangement to be interconnected with at least one pump capacitor arrangement via a plurality of switches controllable to switch between a first and a second configuration,
    the DC capacitor arrangement to include a plurality of DC capacitors each having a first terminal and a second terminal,
    wherein two or more DC capacitors of the plurality of DC capacitors to be coupled via their first terminals in between the plurality of switches at a first and a second node,
    wherein the two or more DC capacitors of the plurality of DC capacitors to be directly coupled via their second terminals to a phase pump at a common node, and
    wherein an additional DC capacitor is to be coupled to the phase pump via a particular one of the two or more DC capacitors, such that its first terminal is coupled in between the plurality of switches at a third node and its second terminal is coupled to either the first node or the second node.

2. The apparatus of claim 1, wherein the controller to synchronize the phase pump with one or more switches of the plurality of switches during switching between the first and the second configuration.

3. The apparatus of claim 2, wherein the controller to synchronize the phase pump with the one or more switches so as to facilitate a substantially uniform distribution of voltage stress among one or more capacitors of the DC capacitor arrangement and one or more capacitors of the at least one pump capacitor arrangement.

4. The apparatus of claim 1, wherein the plurality of switches comprises one or more active devices.

5. The apparatus of claim 4, wherein the one or more active devices comprises one or more transistors.

6. The apparatus of claim 1, wherein the multi-phase switched capacitor converter comprises a cascade multiplier.

7. The apparatus of claim 6, wherein the cascade multiplier comprises an asymmetric cascade multiplier.

8. The apparatus of claim 1, wherein the phase pump comprises switches that operate out of phase.

9. The apparatus of claim 1, wherein the dead-time interval comprises a time interval between the first and the second configuration.

10. The apparatus of claim 1, wherein the multi-phase switched capacitor converter to couple a voltage source to a load during the first and the second configuration.

11. The apparatus of claim 1,
    wherein first node has a first node voltage which is higher than the common node voltage,
    wherein the second node has a second node voltage which is higher than the common node voltage, and
    wherein the first node voltage and the second node voltage can be equal or different.

12. The apparatus of claim 11, wherein the phase pump cycles between a first interval and a second interval at a given frequency.

13. The apparatus of claim 12,
    wherein, in the first interval, the voltage of the phase pump at the common node is coupled to ground, and
    wherein in the second interval, the voltage of the phase pump at the common node is coupled to the lower of the first node voltage and the second node voltage.

14. An apparatus comprising:
a clock to generate one or more timing signals;
a controller to implement a dead-time interval based, at least in part, on the one or more timing signals; and
a switched capacitor converter having a first port and a second port, the switched capacitor converter comprising a plurality of switches to be coupled between the first and the second ports;
a first phase pump to operate out of phase with a second phase pump; and
a plurality of capacitors interconnected with the plurality of switches, the plurality of capacitors to be coupled to the first and the second phase pumps via two or more switches of the plurality of switches,
the plurality of capacitors to include a first capacitor arrangement comprising at least a first, a second, and a third capacitor having respective first and second nodes,
wherein the first nodes of the first, the second, and the third capacitors are to be coupled to the first port,
wherein the second node of the first capacitor is to be coupled to the first node of the second capacitor,
wherein the second nodes of the second and the third capacitors are to be directly DC coupled to the second port, and
wherein, during the operation of the switched capacitor converter, the first capacitor is to be coupled to the second port via the second capacitor.

15. The apparatus of claim 14, wherein, during the operation of the switched capacitor converter, the first capacitor is to be AC coupled to the second port.

16. The apparatus of claim 14, wherein the switched capacitor converter comprises a voltage multiplier.

17. The apparatus of claim 16, wherein the voltage multiplier comprises a multi-phase voltage multiplier.

18. The apparatus of claim 14, wherein the plurality of capacitors to include a second capacitor arrangement to be coupled to the second phase pump.

19. The apparatus of claim 18,
wherein the second capacitor arrangement comprises at least a fourth, a fifth, and a sixth capacitor having respective first and second nodes,
wherein the first nodes of the fourth, the fifth, and the sixth capacitors to be coupled to the first port,
wherein the second node of the fourth capacitor to be coupled to the first node of the fifth capacitor,
wherein the second nodes of the fourth and the fifth capacitor to be directly DC coupled to the second phase pump, and the sixth capacitor to be coupled to the second phase pump via the first capacitor.

20. The apparatus of claim 14, wherein the plurality of switches comprise a set of switches having respective first and second nodes, and the first node of a second switch of the set to be coupled to the second node of a first switch of the set.

21. The apparatus of claim 14, wherein the switched capacitor converter comprises a third capacitor arrangement and a third phase pump.

22. The apparatus of claim 21, wherein the third phase pump is to operate in phase with at least one of the following: the first phase pump; the second phase pump; or any combination thereof.

23. The apparatus of claim 21,
wherein the third capacitor arrangement to include two or more capacitors having respective first and second nodes,
wherein an additional capacitor of the third capacitor arrangement to be coupled to the third phase pump via the first capacitor, and
wherein the second nodes of the two or more capacitors to be DC coupled to the third phase pump.

24. The apparatus of claim 14, wherein the first port has a first port voltage and the second port has a second port voltage, and wherein the first port voltage is higher voltage than the second port voltage.

25. The apparatus of claim 24, wherein the second port is coupled to ground.

26. The apparatus of claim 24, wherein the first phase pump and the second phase pump cycle between a first interval and a second interval at a given frequency.

27. The apparatus of claim 26,
wherein, in the first interval, the voltage at a first phase pump node is coupled to ground and the voltage at a second phase pump node is coupled to the output voltage, and
wherein, in the second interval, the voltage at the second phase pump node is coupled to ground and the voltage at the first phase pump node is coupled to the output voltage.

* * * * *